(12) United States Patent
Sun et al.

(10) Patent No.: US 12,459,536 B1
(45) Date of Patent: Nov. 4, 2025

(54) AUTONOMOUS DRIVING TESTING METHOD BASED ON MULTI-COALITION SWARM CONFRONTATION

(71) Applicant: Tongji University, Shanghai (CN)

(72) Inventors: Jian Sun, Shanghai (CN); Peng Hang, Shanghai (CN); Aijing Kong, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 19/238,205

(22) Filed: Jun. 13, 2025

(30) Foreign Application Priority Data

Jul. 23, 2024 (CN) .......................... 202410992688.X

(51) Int. Cl.
*B60W 60/00* (2020.01)
*B60W 30/10* (2006.01)
(Continued)

(52) U.S. Cl.
CPC ...... *B60W 60/001* (2020.02); *B60W 50/0097* (2013.01); *B60W 50/045* (2013.01);
(Continued)

(58) Field of Classification Search
CPC ........... B60W 30/12; B60W 30/18163; B60W 50/0097; B60W 50/045;
(Continued)

(56) References Cited

U.S. PATENT DOCUMENTS

| 11,685,402 B2 * | 6/2023 | Lee ................... B60W 60/0027 |
| | | 701/27 |
| 2021/0146919 A1 * | 5/2021 | Xu ........................ G08G 1/0112 |

(Continued)

FOREIGN PATENT DOCUMENTS

| CN | 116680979 A | 9/2023 |
| CN | 117826603 A | 4/2024 |

(Continued)

OTHER PUBLICATIONS

Chen, Hongyun, Research on the test method of collision prevention capability of intelligent connected vehicles based on countermeasures, China Master's Theses Full-text Database Issue 10, pp. 43-51.

*Primary Examiner* — Peter D Nolan
*Assistant Examiner* — Ce Li Li
(74) *Attorney, Agent, or Firm* — Hawaii Patent Services; Nathaniel K. Fedde; Kenton N. Fedde

(57) ABSTRACT

The present invention proposes an autonomous driving testing method based on multi-alliance cluster confrontation, aiming to improve the efficiency and accuracy of autonomous driving simulation test, and comprising S1—initialization of testing environment of autonomous driving; S2—decision-making for dividing background vehicle clusters; S3—decision-making for confrontation behaviors of the background vehicles; S4—trajectory planning for the background vehicles; and S5—looping through the steps S2, S3, and S4 until cluster confrontation testing tasks are completed. The method of the present invention uses reinforcement learning and alliance games to dynamically generate testing scenarios that are highly confrontational to vehicles being tested, which can find dangerous boundary scenarios for autonomous driving more quickly and improve the efficiency of simulation testing.

7 Claims, 2 Drawing Sheets

(51) Int. Cl.
    *B60W 50/00*   (2006.01)
    *B60W 50/04*   (2006.01)
    *G05B 13/02*   (2006.01)
    *B60W 30/12*       (2020.01)
    *B60W 30/18*       (2012.01)

(52) U.S. Cl.
    CPC ......... *G05B 13/0265* (2013.01); *B60W 30/12* (2013.01); *B60W 30/18163* (2013.01); *B60W 2050/0022* (2013.01); *B60W 2050/0026* (2013.01); *B60W 2050/0028* (2013.01); *B60W 2520/10* (2013.01); *B60W 2520/105* (2013.01); *B60W 2520/12* (2013.01); *B60W 2520/125* (2013.01); *B60W 2552/10* (2020.02)

(58) Field of Classification Search
    CPC . B60W 2050/0022; B60W 2050/0026; B60W 2050/0028; B60W 2520/10; B60W 2520/105; B60W 2520/12; B60W 2520/125; B60W 2552/10; G05B 13/00; G05B 13/0265; G06N 3/092
    See application file for complete search history.

(56) References Cited

U.S. PATENT DOCUMENTS

| | | | |
|---|---|---|---|
| 2021/0179118 A1* | 6/2021 | Alt | G06N 3/006 |
| 2022/0063651 A1* | 3/2022 | Dai | B60W 60/001 |
| 2024/0124003 A1* | 4/2024 | Wang | B60W 50/06 |
| 2025/0058802 A1* | 2/2025 | Chen | B60W 60/0027 |

FOREIGN PATENT DOCUMENTS

| | | |
|---|---|---|
| CN | 117892631 A | 4/2024 |
| CN | 118092392 A | 5/2024 |

* cited by examiner

AUTONOMOUS DRIVING TESTING METHOD BASED ON MULTI-COALITION SWARM CONFRONTATION

CROSS-REFERENCE

This application claims the benefit of priority from China Patent Application No. CN 202410992688.X filed on Jul. 23, 2024, the contents of which are hereby incorporated by reference in their entirety.

TECHNICAL FIELD

The present invention relates to the technical field of autonomous driving virtual simulation testing, and in particular to an autonomous driving testing method based on multi-alliance cluster confrontation.

BACKGROUND TECHNOLOGY

In recent years, autonomous driving technology has become a popular research direction in the automotive and transportation fields. Compared to human-driven vehicles, autonomous driving systems can significantly improve traffic safety, reduce accident rates, and have significant improvements in driving comfort and economy. However, in the future, strict autonomous driving system testing will be an indispensable key link to ensure the safety and stability of autonomous driving systems. Autonomous driving testing methods include road testing, field testing, simulation testing, etc. Among them, autonomous driving simulation testing can simulate more complex scenarios, conduct virtualization and automation testing, have high scenario coverage, high safety and low cost, and is currently the most effective autonomous driving testing method.

However, as the level of autonomous driving continues to improve, long-tail scenarios and boundary scenarios have become a major bottleneck restricting autonomous driving simulation testing. The traditional method of generating autonomous driving testing scenarios based on parameter combination is mainly achieved through digital mapping of trajectory data. It does not have the ability to dynamically interact with the vehicles being tested. The testing scenario has a low degree of fit with the vehicles being tested, and it is easy to generate a large number of meaningless redundant scenarios. It is difficult to generate high-risk boundary scenarios, and the efficiency of generating key testing scenarios is low. The autonomous driving testing method based on environmental confrontation fully considers the dynamic interaction relationship between the background vehicles and the vehicles being tested. It can generate testing scenarios with high confrontation with the vehicles being tested in real time by controlling the behavior of the background vehicle. The testing scenarios generated by this method have a high degree of fit and pertinence with the vehicles being tested, making it easier to find high-risk boundary scenarios for the vehicles being tested, effectively improving the efficiency of autonomous driving testing.

SUMMARY OF THE INVENTION

The purpose of the present invention is to overcome the shortcomings of the prior art and disclose an autonomous driving testing method based on multi-alliance cluster confrontation.

The present invention is realized through following technical solutions:

An autonomous driving testing method based on multi-alliance cluster confrontation is characterized in firstly realizing adaptive division of background vehicle confrontation clusters through a reinforcement learning algorithm, dividing background vehicles into groups with different levels of confrontation intensities, and allowing vehicles being tested interact with background vehicle groups with different levels of confrontation intensities; meanwhile, treating background vehicle groups as alliances, and vehicles within the alliances have cooperative relationships, and realizing decision-making for interactive and highly confrontational behaviors of background vehicle alliances through an alliance game method; finally, performing trajectory planning for background vehicle clusters according to behavior decision results, enabling the background vehicles to drive according to planned trajectories; and specifically comprises:
S1—initializing testing environment of autonomous driving;
S2—decision-making for dividing background vehicle clusters;
S3—decision-making for confrontational behaviors of background vehicles;
S4—trajectory planning for the background vehicles;
S5—looping through the steps S2, S3, and S4 until cluster confrontation testing tasks are completed.

The S1 of initializing testing environment of autonomous driving, comprises selecting required testing maps on a virtual simulation testing platform, setting number of lanes, lane widths and other environmental information; determining number of the background vehicles and generating locations; testing tasks; selecting starting points and endpoints for testing in the testing map, and generating global reference paths for tested vehicles' movement.

The S2 of decision-making for dividing background vehicle clusters comprises: using a reinforcement learning algorithm to implement a dividing process of background vehicle confrontation clusters, modeling the dividing process of background vehicle clusters as a Markov decision process, namely $M(S,A,P,R,\gamma)$, where S represents state space of the background vehicle clusters, A represents action space of the background vehicle clusters, P R represents state transition probability, represents an immediate reward obtained after the background vehicle clusters perform actions, and $\gamma$ represents an attenuation factor; all the background vehicles are viewed as agents of the reinforcement learning algorithm, initialized environment information obtained in the step S1 is used as environment information input of the reinforcement learning algorithm, and an optimal division result of environment vehicle clusters, namely action space of the background vehicle clusters, serves as output of the reinforcement learning algorithm and is provided to S3.

The S2 of decision-making for dividing background vehicle clusters further comprises a construction process of a reinforcement learning model as follows: where state space is defined as:

$S=\{i\varepsilon 0,1,\ldots,n|s_i\}$, and $s_i=\{x_i,y_i,v_{x,i},v_{y,i},a_{x,i},a_{y,i}\}$, where n represents number of the background vehicles in a testing environment, and $S_i$ represents driving state information of the background vehicles and the vehicles being tested, $x_i$, $y_i$, $v_{x,i}$, $v_{y,i}$, $a_{x,i}$, $a_{y,i}$ respectively represent longitudinal positions, lateral positions, longitudinal speeds, lateral speeds, longitudinal accelerations, and lateral accelerations of the background vehicles and the vehicles being tested, wherein action space comprises different division schemes of the background vehicle clusters, defined as:

$$A=\{A_1 \times A_2\},$$

$$A_1=\{a_1, a_2, \ldots, a_p\}, \text{ and}$$

$$A_2=\{q_1, \ldots, q_v\},$$

where A represents total action space for reinforcement learning, $A_1=\{a_1, a_2, \ldots, a_p\}$ represents all cluster division schemes under different confrontation intensities for n vehicles, and $A_2=\{q_1, \ldots, q_v\}$ represents a confrontation intensity for each alliance.

A reward function R comprises confrontation intensity reward $r_1$, acceleration reward $r_2$, collision penalty $r_3$, and driving range penalty $r_4$, defined as:

$$R = w_1 r_1 + w_2 r_2 + w_3 r_3 + w_4 r_4,$$

$$r_1 = \sum_{i=1}^{n} \frac{1}{\|(x_i, y_i) - (x_0, y_0)\|},$$

$$r_2 = \sum_{i=1}^{n} \frac{\max(0, a_i)}{a_{max}},$$

$$r_3 = \sum_{i=1}^{n} r_{3,i},$$

$$r_{3,i} = \begin{cases} 1 & \text{if collision happened} \\ 0 & \text{else} \end{cases}, \text{ and}$$

$$r_4 = \sum_{i=1}^{n} \frac{\max(0, d_{max} - d_i)}{d_{max}},$$

where $x_0$, $y_0$ represents longitudinal and lateral positions of the vehicles being tested, $a_i$ represents acceleration of an (i)-th background vehicle, $a_{max}$ represents a maximum acceleration of the background vehicles, $d_{max}$ represents to a maximum distance between the background vehicles and the vehicles being tested, $d_i$ represents distances between the (i)-th background vehicle and the vehicles being tested, $w_1$, $w_2$, $w_3$, $w_4$ represents weights for various rewards;

a training process of the reinforcement learning model, implemented by using a DQN algorithm, is as follows:

firstly establishing a Q-target network with a same structure as a Q-network, initializing both the Q-network and the Q-target network with random parameters and determining a maximum number of training rounds; within each training round:

according to a current network $Q^\pi$ (s,a), selecting actions $a_t$ with a greedy strategy, executing the actions, and updating rewards and state information $(s_t, a_t, r_t, s_{t+1})$, wherein π represents a specific strategy;

storing $(s_t, a_t, r_t, s_{t+1})$ in a replay pool D, if there is sufficient data in D, sampling N data points from D to input into the Q-target network, so as to compute a learning target $y_i = r_i + \gamma \max_a Q_\omega^- (s_{i+1}, a)$, minimizing target loss to update current weights of the Q-network, updating the Q-target network, and repeating the above process until reaching the maximum number of training rounds; and when the reinforcement learning model is trained to converge, an action output is the optimal division result of environment vehicle clusters.

The S3 of decision-making for confrontational behaviors of background vehicles, comprises dividing the background vehicle groups into alliances with different levels of confrontation intensities based on division results of the background vehicle clusters; using an alliance game method to achieve collaborative behavior decision-making among the background vehicle clusters, establishing cooperative relationships between alliances to collectively implement confrontation processes against the vehicles being tested, thereby enhancing confrontation intensities of scenarios.

In the S3 of decision-making for confrontational behaviors of background vehicles, action space of the alliances is defined as:

$$A_{coal}=\{i \in 1, \ldots, m | a_{m,i}\}, \text{ and}$$

$$a_{m,i}=\{b_1, b_2, b_3, b_4, b_5, b_6, b_7\},$$

where $A_{coal}$ represents the action space of the alliances, m represents number of vehicles within the alliances, $a_{m,i}$ represents action space of a (i)-th vehicle within the alliances, and $b_1$, $b_2$, $b_3$, $b_4$, $b_5$, $b_6$, $b_7$ represent executable actions for vehicles within the alliances, which are: lane change to left, lane change to right, lane keeping, significant acceleration, significant deceleration, minor acceleration, and minor deceleration;

after establishing the action space, it is necessary to predict states of vehicles within the alliances after selecting different actions, and predict states of the background vehicles at next moments after performing corresponding actions; and a prediction process is as follows:

for an (i)-th vehicle in an (m)-th alliance, let current vehicle state information, a longitudinal position, a lateral position, a lateral speed and a longitudinal speed be x(k), y(k), $v_x(k)$, $v_y(k)$ respectively, and a predicted time domain is T;

then a predicted state thereof at a next moment is as follows:

$$x(k+1) = x(k) + v_x(k)T + \frac{1}{2}a_x T^2,$$

$$y(k+1) = y(k) + v_y(k)T + \frac{1}{2}a_y T^2,$$

$$v_x(k+1) = v_x(k) + a_x T, \text{ and}$$

$$v_y(k+1) = v_y(k) + a_y T,$$

where when different actions are selected, $a_x$ and $a_y$ take different values; after completing action prediction, a profit function is established to calculate profits obtained by the alliances for different actions selected, and the profit function E comprises a confrontation profit $E_1$, a speed profit $E_2$, and a target tracking profit $E_3$, and a calculation process is as follows:

$$E_1 = \sum_{i=1}^{m} \frac{1}{\|(x_i, y_i) - (x_0, y_0)\|},$$

$$E_2 = \sum_{i=1}^{m} \frac{1}{\|(v_{x,i}, v_{y,i}) - (v_{x,0}, v_{y,0})\|},$$

$$E_3 = \sum_{i=1}^{m} \frac{1}{\|(x_i, y_i) - (x_{targ}, y_{targ})\|}, \text{ and}$$

$$E = w_1 E_1 + w_2 E_2 + w_3 E_3,$$

where $x_{targ}, y_{targ}$ represent targeted positions that vehicles are expected to reach after selecting different actions, and $w_1, w_2, w_3$ represent weight coefficients for mentioned profits, $w_1$ represents a weight coefficient of the confrontation profit $E_1$ and is related to confrontation intensity, and specifically for an (i)-th alliance, $w_{1,i}=w\times q_i$, where W is a constant; and let probabilities that vehicles select different strategies be optimization variables and establish a mixed strategy optimization problem of alliance game, with following objective function and constraint:

$$\max J = \sum_{i=1}^{n_{coal}} \sum_{j=1}^{n_{act}} E_j \cdot u_{ij}, \text{ and}$$

$$\sum_{i=1}^{n_{act}} u_i = 1,$$

where $n_{coal}$ represents number of alliances, $n_{act}$ represents number of actions that each alliance can choose from, and $u_{ij}$ be a probability of an (i)-th alliance selecting a (j)-th action; the constraint is such that the sum of probabilities of all actions chosen by the alliances equals 1; and the above optimization problem is solved to obtain mixed strategy decision results of the alliances, actions are sampled according to strategy distribution, and sampling results are behavior decision results of the background vehicles.

The S4 of trajectory planning for the background vehicles comprises:

firstly establishing a Frenet curve coordinate system with a road centerline as a reference, and completing subsequent steps of trajectory planning in the Frenet coordinate system;

secondly according to behavior decision results of the background vehicles, determining a position range of trajectory planned endpoints, $x_{lim}=[x_{min}, x_{max}]$ and $y_{lim}=[y_{min}, y_{max}]$, and a time range for reaching the trajectory planned endpoints $t_{lim}=[t_{min}, t_{max}]$; and uniformly sampling at a certain position interval and a certain time interval within calculated position range and time range, and combining sampled position information and time information to obtain state information of the trajectory planned endpoints;

using a quintic polynomial method to fit trajectories from a current starting point to different endpoint states to form a trajectory cluster; establishing trajectory evaluation indicators to evaluate the trajectories in the trajectory cluster, and selecting an optimal trajectory to be output trajectory planned result, wherein the trajectory evaluation indicators are established as follows:

$$E_t^1 = v_x(t_f) - v_x(t_0),$$

$$E_t^2 = \|(x_{targ}, y_{targ}) - (x(t_f), y(t_f))\|,$$

$$E_t^3 = \begin{cases} -1 & \text{if collision happened} \\ 0 & \text{else} \end{cases}, \text{ and}$$

$$E_t = w_{t1}E_{t1} + w_{t1}E_{t2} + w_{t3}E_{t3},$$

Where $E_{t1}$ is the speed benefit, $E_{t2}$ is the target benefit, $E_{t3}$ is the collision benefit, $v_x$ is the longitudinal speed of the trajectory, $t_0$ and $t_f$ are the start and end times of the trajectory, respectively, $x_{targ}, y_{targ}$ is the expected endpoint position of the trajectory, and $w_{t1}, w_{t2}, w_{t3}$ are the weights of each indicator.

An optimal trajectory is selected as a reference trajectory for the background vehicles through the trajectory evaluation indicators, and the trajectory planned results are then input into a lower-level trajectory tracking controller, allowing the background vehicles to drive according to the reference trajectory.

The S5 of looping through the steps S2, S3, and S4 until cluster confrontation testing tasks are completed, comprises:

when the vehicles being tested and the background vehicles have completed decision-making and planning processes, state information of the vehicles being tested and the background vehicles are updated according to planned results, and corresponding environment information is also updated; based on updated environment information, termination conditions of the testing tasks are determined: if current test time has reached a predetermined test time or one of the vehicles being tested collides with one of the background vehicles, the testing tasks end, otherwise the above S2, S3, and S4 steps are executed in a loop until the cluster confrontation testing tasks are completed.

The present invention proposes an autonomous driving testing method based on multi-alliance cluster confrontation, aiming to improve the efficiency and accuracy of autonomous driving simulation testing. The method dynamically generates testing scenarios that are highly confrontational with the vehicles being tested through reinforcement learning and alliance game, which can find the dangerous boundary scenarios of autonomous driving more quickly and improve the efficiency of simulation testing.

The advantages of the present invention are as follows:

1. The present invention realizes adaptive division of background vehicle clusters through a reinforcement learning algorithm, realizes continuous adjustment of strategy through interaction with the environment, has strong environmental adaptability, can dynamically generate high-fit risk scenarios for different tested objects, and improves the generalization of the testing method.

2. The present invention models the cooperative relationships between background vehicle clusters through alliance game, improves the overall scene confrontation strength through the collaborative cooperation of background vehicle clusters, can generate more complex scenarios, and improves test efficiency.

SPECIFIC EMBODIMENTS

The technical solutions of the present invention belongs to an autonomous driving virtual simulation testing method, which can be applied to scenes such as multi-lane highways, ramp merging, and unprotected left turns. The technical solutions of the present invention are applied to an autonomous driving virtual simulation testing platform (hereinafter referred to as the testing platform):

The testing platform is an upper host.

The testing platform can collect state information of tested autonomous driving vehicles in real time and transmit the information to environment vehicle clusters.

The method of the present invention runs on the testing platform, and the obtained planning results are input to a lower-level trajectory tracking controller, which controls the real-time operation of the environment vehicle clusters.

The present invention proposes an autonomous driving testing method based on multi-alliance cluster confrontation, which runs on a testing platform: first, adaptive division of background vehicle confrontation clusters is realized through a reinforcement learning algorithm, and the background vehicles are divided into groups with different levels of confrontation intensities. The vehicles being tested interact with the background vehicle groups with different confrontation intensity levels, which can more comprehensively test the autonomous driving ability of the vehicles being tested, effectively improve the diversity of scenes and the difficulty of testing, and facilitate the finding of dangerous boundary scenes. At the same time, each background vehicle group is regarded as an alliance, and vehicles within alliances have a cooperative relationship. The interactive and highly confrontational behavior decision of the background vehicle alliances is realized through an alliance game method. Finally, the trajectory planning for the background vehicle clusters is according to behavior decision results, so that the background vehicles can drive according to planned trajectories.

The technical solutions of the present invention are further introduced in combination with the accompanying drawings and embodiments.

Embodiment 1

The present embodiment comprises:
defining a vehicle being tested: a high-level autonomous driving vehicle that needs to be simulated and tested, equipped with high-performance sensors and has autonomous perception, decision-making planning, and control capabilities; and
defining background vehicles: other vehicles generated in the simulation testing platform that have an interactive relationship with the vehicle being tested.

Figure 1:
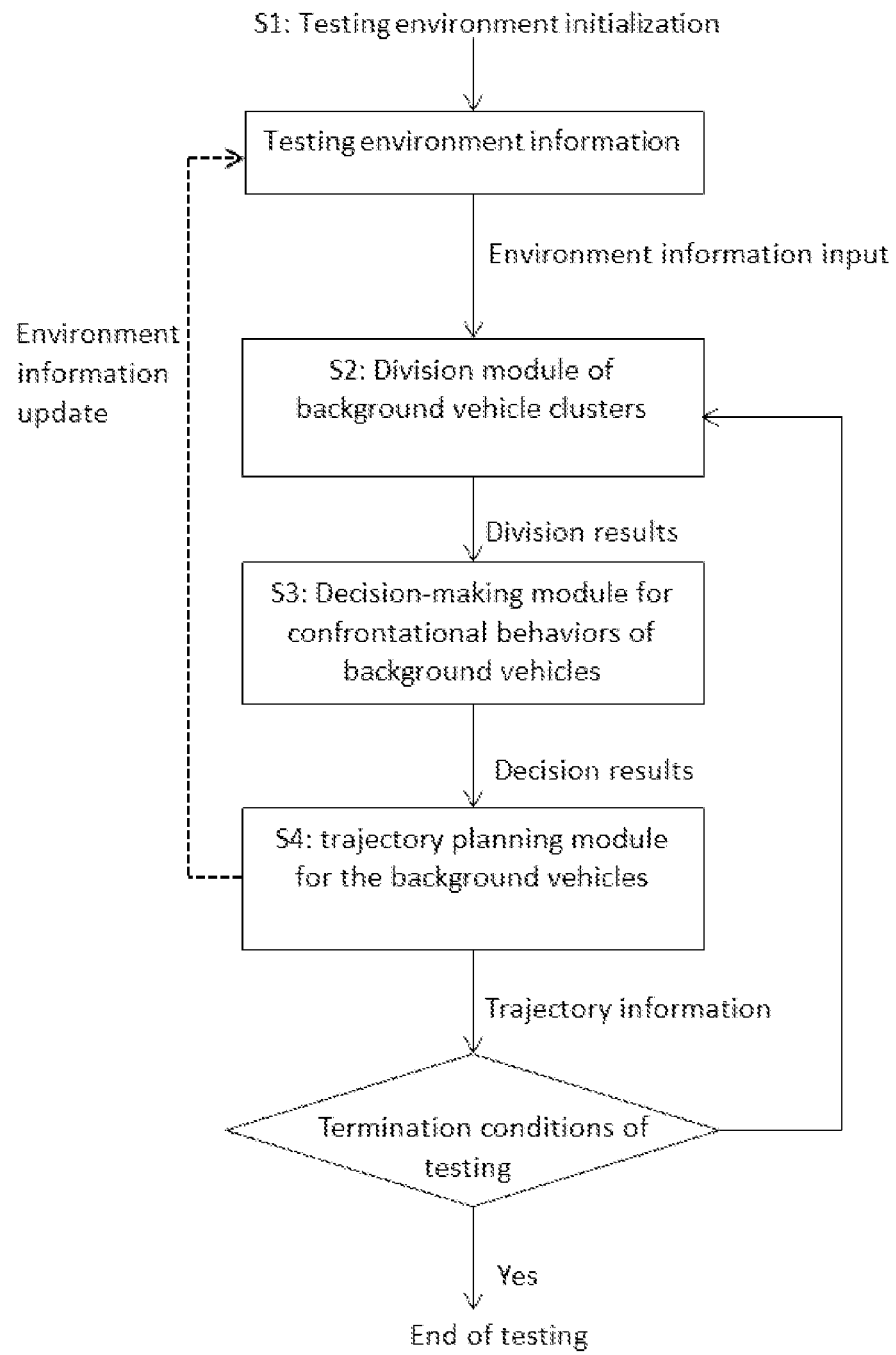
FIG. 1 is a flow chart of a testing process of the present invention.

As shown in FIG. 1, an autonomous driving testing method based on multi-alliance cluster confrontation comprises following steps:

S1—initializing testing environment of autonomous driving;

The method of the present invention is implemented based on an autonomous driving simulation platform, which can provide a variety of autonomous driving virtual simulation scenes and vehicle models. The planning and control algorithm is connected to the autonomous driving simulation platform to control the movement of vehicles in the virtual scene. The autonomous driving simulation platform is an autonomous driving virtual simulation testing platform, which can provide test scenes, vehicle models, sensor models, etc., to achieve closed-loop simulation of autonomous driving.

Figure 2:
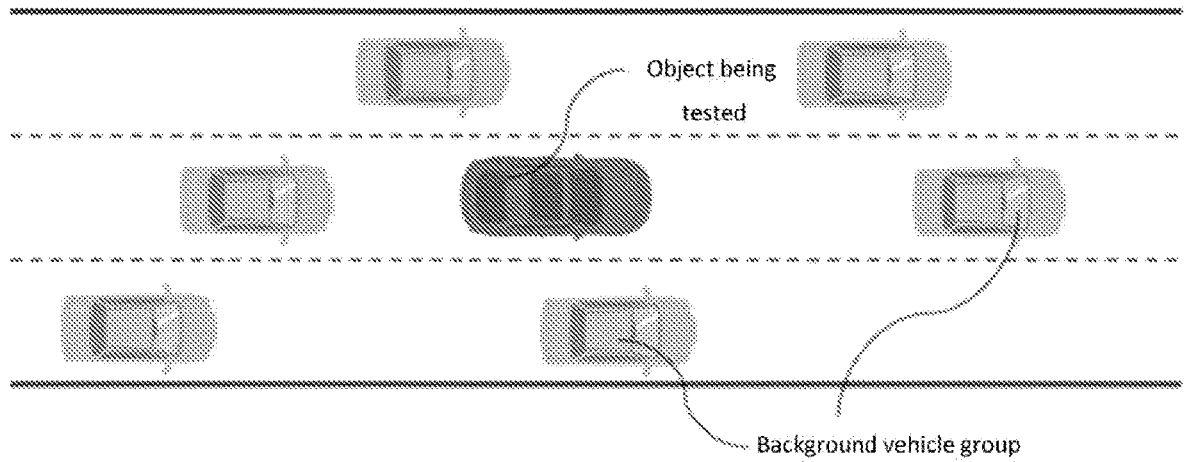
FIG. 2 is a schematic diagram of an initial simulation scenario of an embodiment of the present invention.

On the virtual simulation testing platform, select the required testing map, set the environment information such as the number of lanes and lane width, determine the number and generation location of background vehicles, edit the testing tasks, select the starting and end points of the testing in the testing map, and generate a global reference path for the vehicle being tested. The schematic diagram of the initial simulation scenario is shown in the FIG. 2.

S2—Decision-Making for Dividing Background Vehicle Clusters:

using a reinforcement learning algorithm to implement a dividing process of background vehicle confrontation clusters, modeling the dividing process of background vehicle clusters as a Markov decision process, namely $M(S,A,P,R,\gamma)$, where S represents state space of the background vehicle clusters, represents action space of the background vehicle clusters, P represents state transition probability, R represents an immediate reward obtained after the background vehicle clusters perform actions, and $\gamma$ represents an attenuation factor; all the background vehicles are viewed as agents of the reinforcement learning algorithm, initialized environment information obtained in the step S1 is used as environment information input of the reinforcement learning algorithm, and an optimal division result of environment vehicle clusters, namely action space of the background vehicle clusters, serves as output of the reinforcement learning algorithm and is provided to S3.

More specific details are as follows:

The S2 of decision-making for dividing background vehicle clusters further comprises a construction process of a reinforcement learning model as follows: where state space is defined as:

$$S=\{i\varepsilon 0,1,\ldots,n|s_i\}, \text{ and}$$

$$s_i=\{x_i,y_i,v_{x,i},v_{y,i},a_{x,i},a_{y,i}\},$$

where n represents number of the background vehicles in a testing environment, and $S_i$ represents driving state information of the background vehicles and the vehicles being tested, $x_i$, $y_i$, $v_{x,i}$, $v_{y,i}$, $a_{x,i}$, $a_{y,i}$ respectively represent longitudinal positions, lateral positions, longitudinal speeds, lateral speeds, longitudinal accelerations, and lateral accelerations of the background vehicles and the vehicles being tested, wherein action space comprises different division schemes of the background vehicle clusters, defined as:

$$A=\{A_1 \times A_2\},$$

$$A_1=\{a_1,a_2,\ldots,a_p\}, \text{ and}$$

$$A_2=\{q_1,\ldots,q_v\},$$

where A represents total action space for reinforcement learning, $A_1=\{a_1,a_2,\ldots,a_p\}$ represents all cluster division schemes under different confrontation intensities for n vehicles, and $A_2=(q_1,\ldots,q_v)$ represents a confrontation intensity for each alliance.

A reward function R comprises confrontation intensity reward $r_1$, acceleration reward $r_2$, collision penalty $r_3$, and driving range penalty $r_4$, defined as:

$$R = w_1 r_1 + w_2 r_2 + w_3 r_3 + w_4 r_4,$$

$$r_1 = \sum_{i=1}^{n} \frac{1}{\|(x_i, y_i) - (x_0, y_0)\|},$$

$$r_2 = \sum_{i=1}^{n} \frac{\max(0, a_i)}{a_{max}},$$

$$r_3 = \sum_{i=1}^{n} r_{3,i},$$

-continued $$r_{3,i} = \begin{cases} 1 & \text{if collision happened} \\ 0 & \text{else} \end{cases}, \text{ and}$$

$$r_4 = \sum_{i=1}^{n} \frac{\max(0, d_{max} - d_i)}{d_{max}},$$

where $x_0, y_0$ represents longitudinal and lateral positions of the vehicles being tested, represents acceleration of an (i)-th background vehicle, $a_{max}$ represents a maximum acceleration of the background vehicles, $d_{max}$ represents to a maximum distance between the background vehicles and the vehicles being tested, $d_i$ represents distances between the (i)-th background vehicle and the vehicles being tested, $w_1$, $w_2$, $w_3$, $w_4$ represents weights for various rewards.

Figure 3:
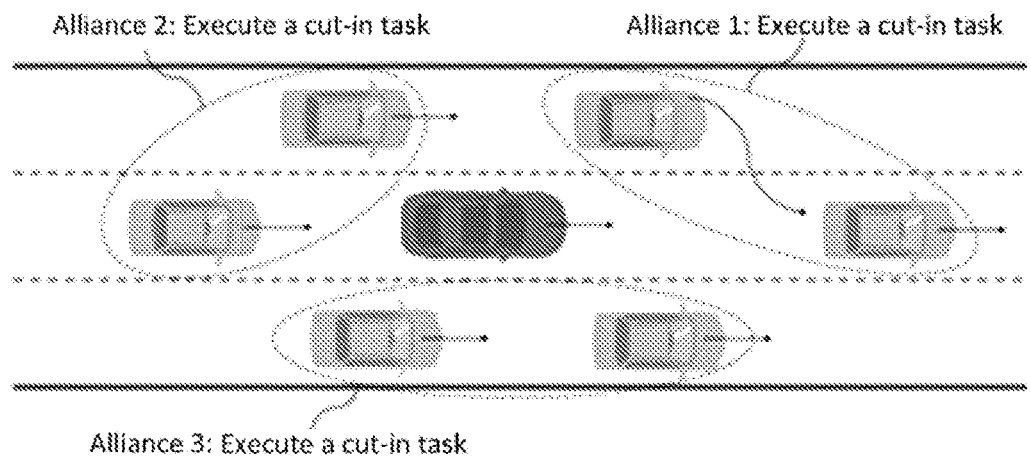
FIG. 3 is a schematic diagram of a multi-alliance cluster confrontation process of an embodiment of the present invention.

After the reinforcement learning model is constructed, it is necessary to conduct pre-training on the reinforcement learning model A training process of the reinforcement learning model, implemented by using a DQN algorithm, is as follows:

firstly establishing a Q-target network with a same structure as a Q-network, initializing both the Q-network and the Q-target network with random parameters and determining a maximum number of training rounds;

within each training round:

according to a current network $Q^\pi$ (s,a), selecting actions $a_t$ with a greedy strategy, and executing the actions and updating rewards and state information $(s_i, a_i, r_i, s_{t+1})$, wherein $\pi$ represents a specific strategy;

storing $(s_i, a_i, r_i, s_{t+1})$ in a replay pool D, if there is sufficient data in D, sampling N data points from D to input into the Q-target network, so as to compute a learning target $y_i = r_i + \gamma \max_a Q_\omega - (s_{i+1}, a)$, minimizing target loss to update current weights of the Q-network, updating the Q-target network, and repeating the above process until reaching the maximum number of training rounds; and when the reinforcement learning model is trained to converge, an action output is the optimal division result of environment vehicle clusters.

s3—Decision-Making for Confrontational Behaviors of Background Vehicles;

According to the background vehicle group division results, the background vehicle clusters are divided into alliances with different confrontation strengths. The coordinated behavior decision of the background vehicle clusters is realized through the alliance game method, and the alliances establish a cooperative relationship to jointly realize the confrontation process of the vehicle being tested, thereby improving the confrontation strength of the scene. The background vehicle cluster confrontation process is shown in the FIG. 3. Preferably, the alliance game belongs to a mixed strategy dynamic game. During the game process, each alliance makes a decision in a certain order, and the latter alliances know the decision results of all the previous alliances when making a decision. In addition, the decision result of each alliance is not a fixed strategy, but a probability distribution of different strategies, which can improve the diversity of strategies and better cope with complex and changing dynamic game environments.

Preferably, action space of the alliances is defined as:

$$A_{coal} = \{i \in 1, \ldots, m | a_{m,i}\}, \text{ and}$$

$$a_{m,i} = \{b_1, b_2, b_3, b_4, b_5, b_6, b_7\},$$

where $A_{coal}$ represents the action space of the alliances, m represents number of vehicles within the alliances, $a_{m,i}$ represents action space of a (i)-th vehicle within the alliances, and $b_1$, $b_2$, $b_3$, $b_4$, $b_5$, $b_6$, $b_7$ represent executable actions for vehicles within the alliances, which are: lane change to left, lane change to right, lane keeping, significant acceleration, significant deceleration, minor acceleration, and minor deceleration;

after establishing the action space, it is necessary to predict states of vehicles within the alliances after selecting different actions, and predict states of the background vehicles at next moments after performing corresponding actions; and a prediction process is as follows:

for an (i)-th vehicle in an (m)-th alliance, let current vehicle state information, a longitudinal position, a lateral position, a lateral speed and a longitudinal speed be x(k), y(k), $v_x(k)$, $v_y(k)$ respectively, and a predicted time domain is T;

then a predicted state thereof at a next moment is as follows:

$$x(k+1) = x(k) + v_x(k)T + \frac{1}{2}a_x T^2,$$

$$y(k+1) = y(k) + v_y(k)T + \frac{1}{2}a_y T^2,$$

$$v_x(k+1) = v_x(k) + a_x T, \text{ and}$$

$$v_y(k+1) = v_y(k) + a_y T,$$

where when different actions are selected, $a_x$ and $a_y$ take different values; after completing action prediction, a profit function is established to calculate profits obtained by the alliances for different actions selected, and the profit function E comprises a confrontation profit $E_1$, a speed profit $E_2$, and a target tracking profit $E_3$, and a calculation process is as follows:

$$E_1 = \sum_{i=1}^{m} \frac{1}{\|(x_i, y_i) - (x_0, y_0)\|},$$

$$E_2 = \sum_{i=1}^{m} \frac{1}{\|(v_{x,i}, v_{y,i}) - (v_{x,0}, v_{y,0})\|},$$

$$E_3 = \sum_{i=1}^{m} \frac{1}{\|(x_i, y_i) - (x_{targ}, y_{targ})\|}, \text{ and}$$

$$E = w_1 E_1 + w_2 E_2 + w_3 E_3,$$

where $x_{targ}, y_{targ}$ represent targeted positions that vehicles are expected to reach after selecting different actions, and $w_1$, $w_2$, $w_3$ represent weight coefficients for mentioned profits, $w_1$ represents a weight coefficient of the confrontation profit $E_1$ and is related to confrontation intensity, and specifically for an (i)-th alliance, $w_{1,i} = w \times q_i$, where W is a constant;

let probabilities that vehicles select different strategies be optimization variables and establish a mixed strategy optimization problem of alliance game, with following objective function and constraint:

$$\max J = \sum_{i=1}^{n_{coal}} \sum_{j=1}^{n_{act}} E_j \cdot u_{ij}, \text{ and}$$

-continued $$\sum_{i=1}^{n_{act}} u_i = 1,$$

Where $n_{coal}$ represents number of alliances, $n_{act}$ represents number of actions that each alliance can choose from, and $u_{ij}$ be a probability of an (i)-th alliance selecting a (j)-th action; the constraint is such that the sum of probabilities of all actions chosen by the alliances equals 1; and the above optimization problem is solved to obtain mixed strategy decision results of the alliances, actions are sampled according to strategy distribution, and sampling results are behavior decision results of the background vehicles.

s4—Trajectory Planning for the Background Vehicles;

Based on the behavior decision results of the background vehicles, trajectory planning is performed for the background vehicles. In the present embodiment, the Lattice method is used for path planning.

firstly establishing a Frenet curve coordinate system with a road centerline as a reference, and completing subsequent steps of trajectory planning in the Frenet coordinate system;

secondly according to behavior decision results of the background vehicles, determining a position range of trajectory planned endpoints, $x_{lim}=[x_{min},x_{max}]$ and $y_{lim}=[y_{min},y_{max}]$, and a time range for reaching the trajectory planned endpoints $t_{lim}=[t_{min},t_{max}]$; and uniformly sampling at a certain position interval and a certain time interval within calculated position range and time range, and combining sampled position information and time information to obtain state information of the trajectory planned endpoints;

using a quintic polynomial method to fit trajectories from a current starting point to different endpoint states to form a trajectory cluster;

establishing a dynamics verification module to filter endpoint trajectories in the trajectory clusters and delete the trajectories that do not meet the vehicle dynamics requirements;

establishing trajectory evaluation indicators to evaluate the trajectories in the trajectory cluster, and selecting an optimal trajectory to be output trajectory planned result, wherein the trajectory evaluation indicators are established as follows:

$$E_t^1 = v_x(t_f) - v_x(t_0),$$

$$E_t^2 = \|(x_{targ}, y_{targ}) - (x(t_f), y(t_f))\|,$$

$$E_t^3 = \begin{cases} -1 & \text{if collision happened} \\ 0 & \text{else} \end{cases}, \text{ and}$$

$$E_t = w_{t1}E_{t1} + w_{t1}E_{t2} + w_{t3}E_{t3},$$

where $E_{t1}$ represents speed benefit, $E_{t2}$ represents target benefit, $E_{t3}$ represents collision benefit, $v_x$ represents longitudinal speed of trajectory, $t_0$ and $t_f$ represent start and end times of trajectory, respectively, $x_{targ},y_{targ}$ represents expected endpoint position of trajectory, and $w_{t1}, w_{t2}, w_{t3}$ are weights of the indicators.

An optimal trajectory is selected as a reference trajectory for the background vehicles through the trajectory evaluation indicators, and the trajectory planned results are then input into a lower-level trajectory tracking controller, allowing the background vehicles to drive according to the reference trajectory.

S5—Looping Through the Steps S2, S3, and S4 Until Cluster Confrontation Testing Tasks are Completed.

when the vehicles being tested and the background vehicles have completed decision-making and planning processes, state information of the vehicles being tested and the background vehicles are updated according to planned results, and corresponding environment information is also updated; based on updated environment information, termination conditions of the testing tasks are determined: if current test time has reached a predetermined test time or one of the vehicles being tested collides with one of the background vehicles, the testing tasks end, otherwise the above S2, S3, and S4 steps are executed in a loop until the cluster confrontation testing tasks are completed.

The invention claimed is:

1. An autonomous driving testing method based on multi-alliance cluster confrontation, comprising: firstly realizing adaptive division of background vehicle confrontation clusters through a reinforcement learning algorithm, dividing background vehicles into groups with different levels of confrontation intensities, and allowing vehicles being tested interact with background vehicle groups with different levels of confrontation intensities; meanwhile, treating background vehicle groups as alliances, and vehicles within the alliances have cooperative relationships, and realizing decision-making for interactive and highly confrontational behaviors of background vehicle alliances through an alliance game method; finally, performing trajectory planning for background vehicle clusters according to behavior decision results, enabling the background vehicles to drive according to planned trajectories; and specifically comprising:
S1—initializing testing environment of autonomous driving;
S2—decision-making for dividing background vehicle clusters;
S3—decision-making for confrontational behaviors of background vehicles;
S4—trajectory planning for the background vehicles; and
S5—looping through the steps S2, S3, and S4 until cluster confrontation testing tasks are completed, wherein
the S2 of decision-making for dividing background vehicle clusters comprises: using a reinforcement learning algorithm to implement a dividing process of background vehicle confrontation clusters, modeling the dividing process of background vehicle clusters as a Markov decision process, namely M(S,A,P,R,γ), wherein S represents state space of the background vehicle clusters, represents action space of the background vehicle clusters, P represents state transition probability, R represents an immediate reward obtained after the background vehicle clusters perform actions, and γ represents an attenuation factor; all the background vehicles are viewed as agents of the reinforcement learning algorithm, initialized environment information obtained in the step S1 is used as environment information input of the reinforcement learning algorithm, and an optimal division result of environment vehicle clusters, namely action space of the background vehicle clusters, serves as output of the reinforcement learning algorithm and is provided to S3;

the S2 of decision-making for dividing background vehicle clusters further comprises: a construction process of a reinforcement learning model, wherein state space is defined as:

$$S=\{i\varepsilon 0,1,\ldots,n|s_i\}, \text{ and}$$

$$s_i=\{x_i,y_i,v_{x,i},v_{y,i},a_{x,i},a_{y,i}\},$$

where n represents number of the background vehicles in a testing environment, and $S_i$ represents driving state information of the background vehicles and the vehicles being tested, $x_i$, $y_i$, $v_{x,i}$, $v_{y,i}$, $a_{x,i}$, $a_{y,i}$ respectively represent longitudinal positions, lateral positions, longitudinal speeds, lateral speeds, longitudinal accelerations, and lateral accelerations of the background vehicles and the vehicles being tested, wherein action space comprises different division schemes of the background vehicle clusters, defined as:

$$A=\{A_1\times A_2\},$$

$$A_1=\{a_1,a_2,\ldots,a_p\}, \text{ and}$$

$$A_2=\{q_1,\ldots,q_v\},$$

where A represents total action space for reinforcement learning, $A_1=\{a_1, a_2, \ldots, a_p\}$ represents all cluster division schemes under different confrontation intensities for n vehicles, and $A_2=\{q_1, \ldots, q_v\}$ represents a confrontation intensity for each alliance;

a reward function R comprises confrontation intensity reward $r_1$, acceleration reward $r_2$, collision penalty $r_3$, and driving range penalty $r_4$, defined as:

$$R = w_1r_1 + w_2r_2 + w_3r_3 + w_4r_4,$$

$$r_1 = \sum_{i=1}^{n} \frac{1}{\|(x_i, y_i) - (x_0, y_0)\|},$$

$$r_2 = \sum_{i=1}^{n} \frac{\max(0, a_i)}{a_{max}},$$

$$r_3 = \sum_{i=1}^{n} r_{3,i},$$

$$r_{3,i} = \begin{cases} 1 & \text{if collision happened} \\ 0 & \text{else} \end{cases}, \text{ and}$$

$$r_4 = \sum_{i=1}^{n} \frac{\max(0, d_{max} - d_i)}{d_{max}},$$

where $x_0,y_0$ represents longitudinal and lateral positions of the vehicles being tested, $a_i$ represents acceleration of an (i)-th background vehicle, $a_{max}$ represents a maximum acceleration of the background vehicles, $d_{max}$ represents to a maximum distance between the background vehicles and the vehicles being tested, $d_i$ represents distances between the (i)-th background vehicle and the vehicles being tested, $w_1$, $w_2$, $w_3$, $w_4$ represents weights for various rewards;

a training process of the reinforcement learning model, implemented by using a DQN algorithm, is as follows:
firstly establishing a Q-target network with a same structure as a Q-network, initializing both the Q-network and the Q-target network with random parameters and determining a maximum number of training rounds;
within each training round:
according to a current network $Q^\pi$ (s,a), selecting actions $a_t$ with a greedy strategy, and executing the actions and updating rewards and state information $(s_i,a_i,r_i,s_{i+1})$, wherein π represents a specific strategy;
storing $(s_i,a_i,r_i,s_{i+1})$ in a replay pool D, if there is sufficient data in D, sampling N data points from D to input into the Q-target network, so as to compute a learning target $y_i=r_i+\gamma\max_a Q_\omega-(s_{i+1},a)$, minimizing target loss to update current weights of the Q-network, updating the Q-target network, and repeating the above process until reaching the maximum number of training rounds; and
when the reinforcement learning model is trained to converge, an action output is the optimal division result of environment vehicle clusters.

2. The autonomous driving testing method based on multi-alliance cluster confrontation according to claim 1, wherein the S1 of initializing testing environment of autonomous driving, comprises selecting required testing maps on a virtual simulation testing platform, setting number of lanes, lane widths and other environmental information; determining number of the background vehicles and generating locations; testing tasks; selecting starting points and endpoints for testing in the testing map, and generating global reference paths for tested vehicles' movement.

3. The autonomous driving testing method based on multi-alliance cluster confrontation according to claim 1, wherein the S3 of decision-making for confrontational behaviors of background vehicles, comprises:
dividing the background vehicle groups into alliances with different levels of confrontation intensities based on division results of the background vehicle clusters; using an alliance game method to achieve collaborative behavior decision-making among the background vehicle clusters, establishing cooperative relationships between alliances to collectively implement confrontation processes against the vehicles being tested, thereby enhancing confrontation intensities of scenarios.

4. The autonomous driving testing method based on multi-alliance cluster confrontation according to claim 3, wherein the alliance game belong to one of mixed strategy dynamic games.

5. The autonomous driving testing method based on multi-alliance cluster confrontation according to claim 3, wherein in the S3 of decision-making for confrontational behaviors of background vehicles, action space of the alliances is defined as:

$$A_{coal}=\{i\varepsilon 1,\ldots,m|a_{m,i}\}, \text{ and}$$

$$a_{m,i}=\{b_1,b_2,b_3,b_4,b_5,b_6,b_7\},$$

where $A_{coal}$ represents the action space of the alliances, m represents number of vehicles within the alliances, $a_{m,i}$ represents action space of a (i)-th vehicle within the alliances, and $b_1,b_2,b_3,b_4,b_5,b_6,b_7$ represent executable actions for vehicles within the alliances, which are: lane change to left, lane change to right, lane keeping, significant acceleration, significant deceleration, minor acceleration, and minor deceleration;
after establishing the action space, it is necessary to predict states of vehicles within the alliances after selecting different actions, and predict states of the background vehicles at next moments after performing corresponding actions; and a prediction process is as follows:
for an (i)-th vehicle in an (m)-th alliance, let current vehicle state information, a longitudinal position, a lateral position, a lateral speed and a longitudinal speed be $x(k)$, $y(k)$, $v_x(k)$, $v_y(k)$ respectively, and a predicted time domain is T;

then a predicted state thereof at a next moment is as follows:

$$x(k+1) = x(k) + v_x(k)T + \frac{1}{2}a_x T^2,$$

$$y(k+1) = y(k) + v_y(k)T + \frac{1}{2}a_y T^2,$$

$$v_x(k+1) = v_x(k) + a_x T, \text{ and}$$

$$v_y(k+1) = v_y(k) + a_y T,$$

where when different actions are selected, $a_x$ and $a_y$ take different values; after completing action prediction, a profit function is established to calculate profits obtained by the alliances for different actions selected, and the profit function E comprises a confrontation profit $E_1$, a speed profit $E_2$, and a target tracking profit $E_3$, and a calculation process is as follows:

$$E_1 = \sum_{i=1}^{m} \frac{1}{\|(x_i, y_i) - (x_0, y_0)\|},$$

$$E_2 = \sum_{i=1}^{m} \frac{1}{\|(v_{x,i}, v_{y,i}) - (v_{x,0}, v_{y,0})\|},$$

$$E_3 = \sum_{i=1}^{m} \frac{1}{\|(x_i, y_i) - (x_{targ}, y_{targ})\|}, \text{ and}$$

$$E = w_1 E_1 + w_2 E_2 + w_3 E_3,$$

where $x_{targ}, y_{targ}$ represent targeted positions that vehicles are expected to reach after selecting different actions, and $w_1$, $w_2$, $w_3$ represent weight coefficients for mentioned profits, $w_1$ represents a weight coefficient of the confrontation profit E and is related to confrontation intensity, specifically for an (i)-th alliance as $w_{1,i} = w \times q_i$, where w is a constant; and let probabilities that vehicles select different strategies be optimization variables and establish a mixed strategy optimization problem of alliance game, with following objective function and constraint:

$$\max J = \sum_{i=1}^{n_{coal}} \sum_{j=1}^{n_{act}} E_j \cdot u_{ij}, \text{ and}$$

$$\sum_{i=1}^{n_{act}} u_i = 1,$$

where $n_{coal}$ represents number of alliances, $n_{act}$ represents number of actions that each alliance can choose from, and $u_{ij}$ be a probability of an (i)-th alliance selecting a (j)-th action; the constraint is such that the sum of probabilities of all actions chosen by the alliances equals 1; and the above optimization problem is solved to obtain mixed strategy decision results of the alliances, actions are sampled according to strategy distribution, and sampling results are behavior decision results of the background vehicles.

6. The autonomous driving testing method based on multi-alliance cluster confrontation according to claim 1, wherein the S4 of trajectory planning for the background vehicles comprises:

firstly establishing a Frenet curve coordinate system with a road centerline as a reference, and completing subsequent steps of trajectory planning in the Frenet coordinate system;

secondly according to behavior decision results of the background vehicles, determining a position range of trajectory planned endpoints, $x_{lim}=[x_{min}, x_{max}]$ and $y_{lim}=[y_{min}, y_{max}]$, and a time range for reaching the trajectory planned endpoints $t_{lim}=[t_{min}, t_{max}]$; and uniformly sampling at a certain position interval and a certain time interval within calculated position range and time range, and combining sampled position information and time information to obtain state information of the trajectory planned endpoints;

using a quintic polynomial method to fit trajectories from a current starting point to different endpoint states to form a trajectory cluster; establishing trajectory evaluation indicators to evaluate the trajectories in the trajectory cluster, and selecting an optimal trajectory to be output trajectory planned result, wherein the trajectory evaluation indicators are established as follows:

$$E_t^1 = v_x(t_f) - v_x(t_0),$$

$$E_t^2 = \|(x_{targ}, y_{targ}) - (x(t_f), y(t_f))\|,$$

$$E_t^3 = \begin{cases} -1 & \text{if collision happened} \\ 0 & \text{else} \end{cases}, \text{ and}$$

$$E_t = w_{t1} E_{t1} + w_{t1} E_{t2} + w_{t3} E_{t3},$$

where $E_{t1}$ represents speed benefit, $E_{t2}$ represents target benefit, $E_{t3}$ represents collision benefit, $v_x$ represents longitudinal speed of trajectory, $t_0$ and $t_f$ represent start time and end time of trajectory, respectively, $x_{targ}, y_{targ}$ represent expected endpoint position of trajectory, and $w_{t1}$, $w_{t2}$, $w_{t3}$ are weights the indicators; and an optimal trajectory is selected as a reference trajectory for the background vehicles through the trajectory evaluation indicators, and the trajectory planned results are then input into a lower-level trajectory tracking controller, allowing the background vehicles to drive according to the reference trajectory.

7. The autonomous driving testing method based on multi-alliance cluster confrontation according to claim 1, wherein the S5 of looping through the steps S2, S3, and S4 until cluster confrontation testing tasks are completed, comprises:

when the vehicles being tested and the background vehicles have completed decision-making and planning processes, state information of the vehicles being tested and the background vehicles are updated according to planned results, and corresponding environment information is also updated; based on updated environment information, termination conditions of the testing tasks are determined:

if current test time has reached a predetermined test time or one of the vehicles being tested collides with one of the background vehicles, the testing tasks end, otherwise the above S2, S3, and S4 steps are executed in a loop until cluster confrontation testing tasks are completed.

* * * * *